United States Patent [19]
Esterberg

[11] Patent Number: 5,346,254
[45] Date of Patent: Sep. 13, 1994

[54] INFLATOR ASSEMBLY

[75] Inventor: Dean M. Esterberg, Tempe, Ariz.

[73] Assignee: TRW Inc., Lyndhurst, Ohio

[21] Appl. No.: 12,054

[22] Filed: Feb. 1, 1993

[51] Int. Cl.$^5$ .............................................. B60R 21/28
[52] U.S. Cl. ..................... 280/741; 280/736; 102/530; 422/166
[58] Field of Search ................ 280/728 R, 735, 736, 280/741; 422/164–166; 102/530, 531

[56] References Cited

U.S. PATENT DOCUMENTS

| | | | |
|---|---|---|---|
| 3,972,545 | 8/1976 | Kirchoff et al. | 280/735 |
| 4,902,036 | 2/1990 | Zander et al. | 280/736 |
| 5,071,160 | 12/1991 | White et al. | 280/735 |
| 5,074,583 | 12/1991 | Fujita et al. | 280/732 X |
| 5,100,174 | 3/1992 | Jasken et al. | 280/741 |
| 5,158,323 | 10/1992 | Yamamoto et al. | 280/735 X |
| 5,221,109 | 6/1993 | Marchant | 280/736 |
| 5,232,243 | 8/1993 | Blackburn et al. | 280/735 X |

FOREIGN PATENT DOCUMENTS 4006741 8/1991 Fed. Rep. of Germany ...... 280/736

Primary Examiner—Margaret A. Focarino
Assistant Examiner—Victor E. Johnson
Attorney, Agent, or Firm—Tarolli, Sundheim & Covell

[57] ABSTRACT

An apparatus (10) for use in inflating an air bag (12) includes an ignitable body (110) of gas generating material and an igniter (206). The body (110) of gas generating material, when ignited, generates gas for inflating the air bag (12). The body (110) of gas generating material has an outer surface area (132). The igniter (206) contains a first output charge (230) and a second output charge (232). When the first and second output charges (230) and (232) are ignited sequentially, the body (110) of gas generating material is ignited at a first ignitable surface area including the outer surface area (132). When the first and second output charges (230 and 232) are ignited simultaneously, the body (110) of gas generating material is ignited at a second ignitable surface area in addition to the first ignitable surface area.

6 Claims, 3 Drawing Sheets

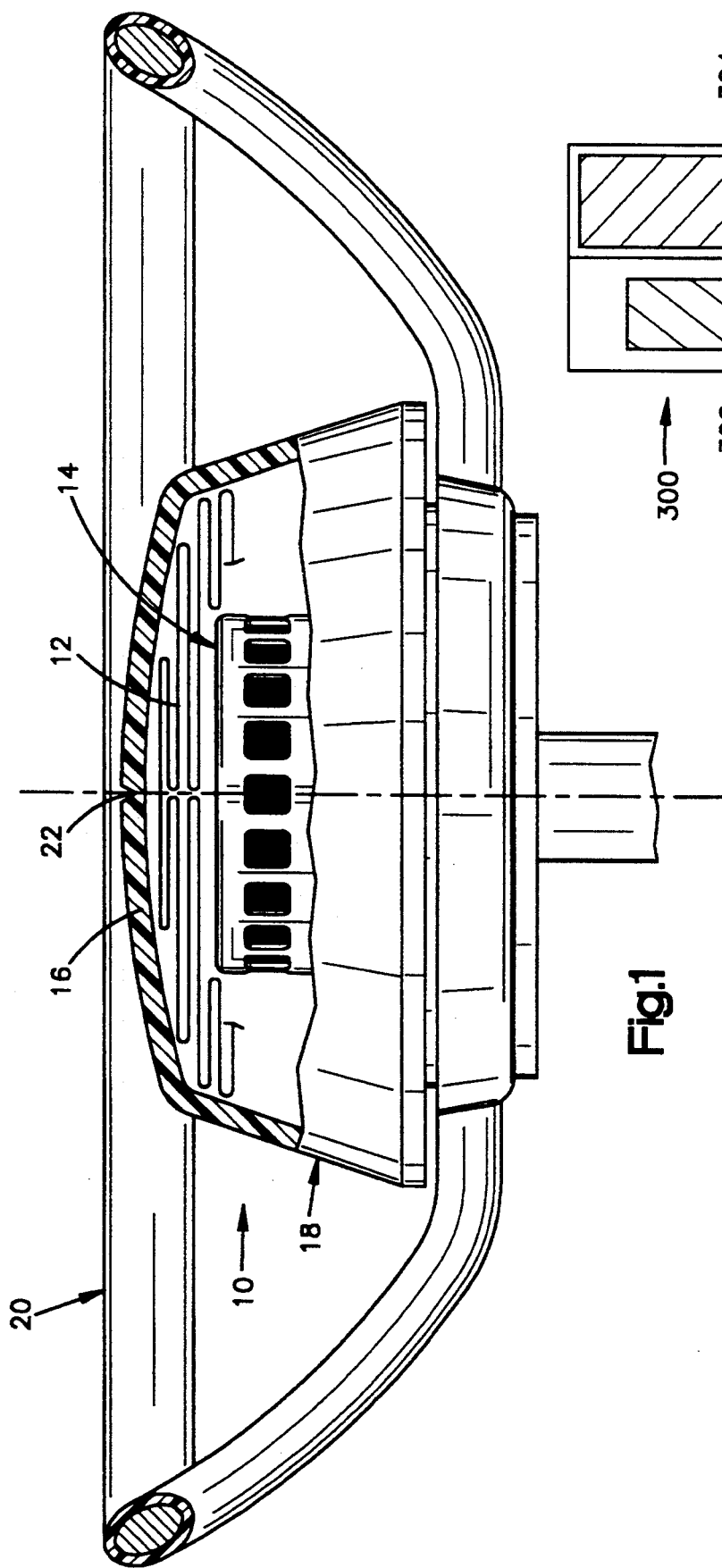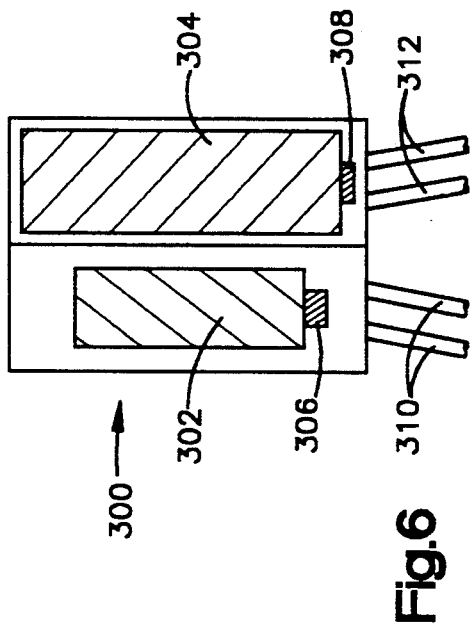

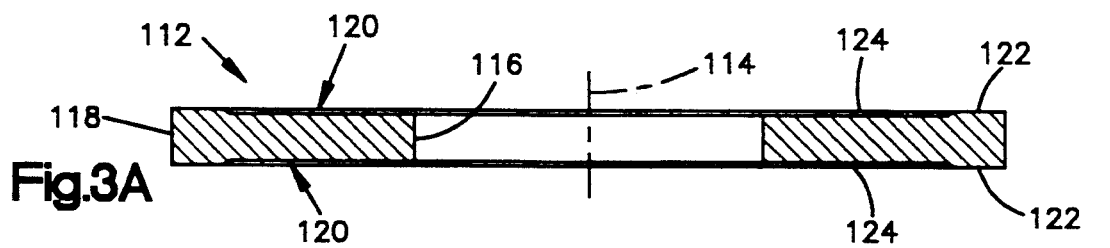
Fig.3A
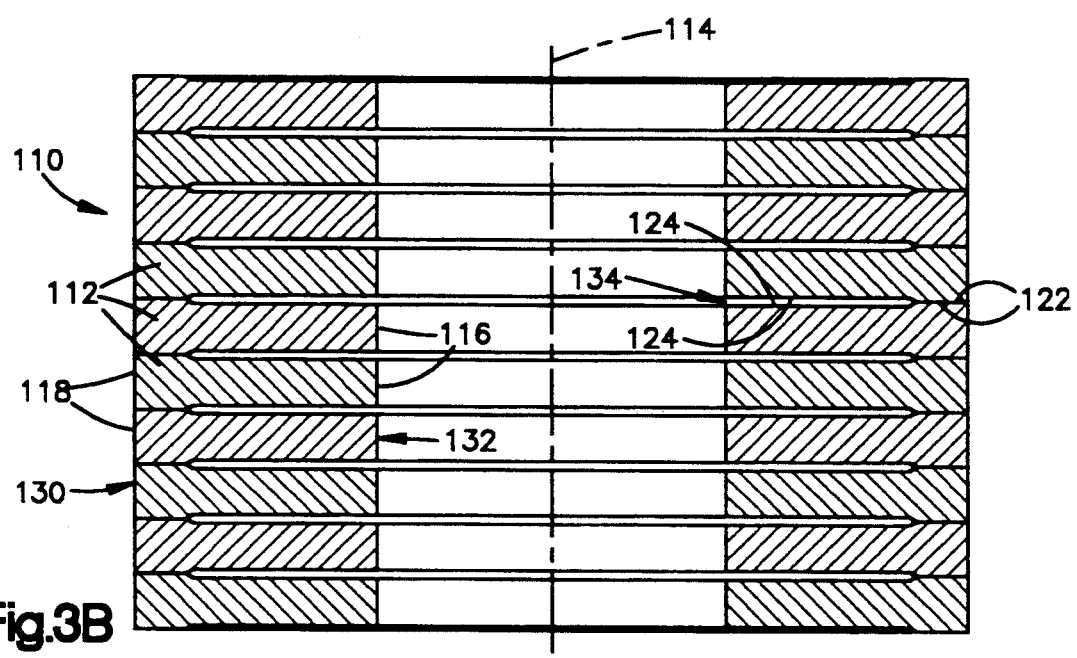
Fig.3B
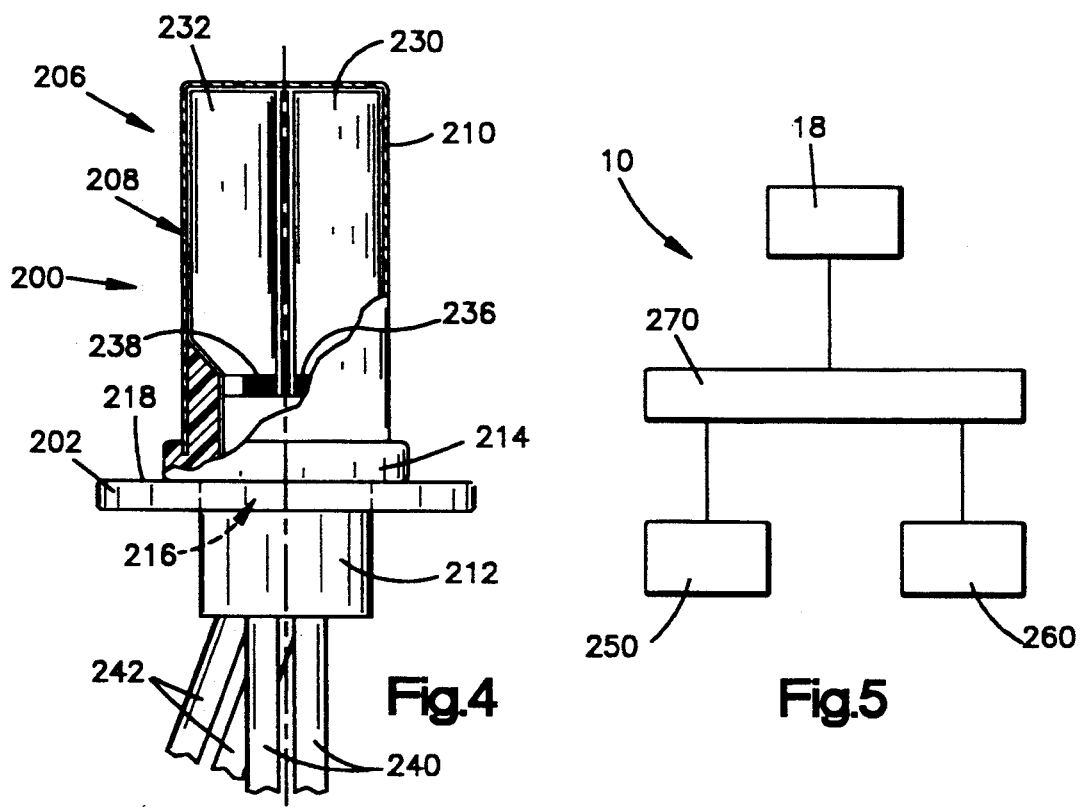
Fig.4
Fig.5

INFLATOR ASSEMBLY

FIELD OF THE INVENTION

The present invention relates to an apparatus for inflating an inflatable vehicle occupant restraint, such as an air bag.

BACKGROUND OF THE INVENTION

An apparatus for inflating an air bag is disclosed in U.S. Pat. No. 5,100,174. The apparatus disclosed in the '174 patent includes an inflator which generates gas for inflating the air bag. The inflator and the air bag are contained in a module which is mounted on a vehicle steering wheel.

The inflator in the apparatus disclosed in the '174 patent contains a body of gas generating material which, when ignited, produces the gas for inflating the air bag. The inflator also contains an igniter which is actuated upon the occurrence of vehicle deceleration indicative of a collision. The igniter includes an ignition charge and an output charge. When the vehicle experiences deceleration indicative of a collision, the ignition charge is ignited electrically. The ignition charge then produces combustion products which ignite the output charge. The output charge, in turn, produces combustion products which emerge from the igniter to ignite the body of gas generating material in the inflator. A large volume of gas is rapidly generated as a product of combustion of the gas generating material. The gas flows through a plurality of filters in the inflator and outward from the inflator to the air bag for inflation of the air bag.

SUMMARY OF THE INVENTION

In accordance with the present invention, an apparatus for use in inflating an inflatable vehicle occupant restraint comprises gas generating means and igniting means. The gas generating means generates gas to inflate the inflatable vehicle occupant restraint. The gas generating means includes an ignitable body of gas generating material which, when ignited, generates combustion products including the gas which inflates the vehicle occupant restraint. The igniting means ignites the body of gas generating material. The igniting means is actuatable in a first stage and, alternatively, in a second stage.

The igniting means, when actuated in the first stage, ignites the body of gas generating material at a first surface area of the body of gas generating material. The igniting means, when actuated in the second stage, ignites the body of gas generating material at a second surface area which is greater than the first surface area.

An apparatus constructed in accordance with the present invention enables an inflatable vehicle occupant restraint, such as an air bag, to be inflated at two different rates of inflation. When the igniting means is actuated in the first stage, the body of gas generating material is ignited at the first surface area. The body of gas generating material then burns at a first rate of combustion, and generates gas at a first rate of gas generation. The air bag is thus inflated at a corresponding first rate of inflation. Alternatively, when the igniting means is actuated in the second stage, the body of gas generating material is ignited at the second, greater surface area. The body of gas generating material then burns at a second, faster rate of combustion. The gas is then generated at a second, faster rate of gas generation, and the air bag is inflated at a corresponding second, faster rate of inflation.

In a preferred embodiment of the present invention, the igniting means includes an igniter containing output charge material. The output charge material, when ignited, produces combustion products which emerge from the igniter to ignite the body of gas generating material. The output charge material includes a first output charge and a second output charge. When the air bag is to be inflated at the first rate of inflation, the first output charge is ignited in response to a first electrical signal. The second output charge is subsequently ignited by the products of combustion emitted from the first output charge. The first and second output charges are thus ignited sequentially. When the air bag is to be inflated at the second, relatively faster rate of inflation, the first and second output charges are ignited simultaneously in response to a second electrical signal. When the first and second output charges are ignited simultaneously, the resulting products of combustion emerge from the igniter more rapidly and forcefully than when the first and second output charges are ignited sequentially. The more rapidly emerging combustion products move against the body of gas generating material forcefully enough to cause a substantial increase in the surface area of the body by breaking the body. As a result, the body of gas generating material is ignited at a substantially greater surface area.

BRIEF DESCRIPTION OF THE DRAWING

The foregoing and other features of the present invention will become apparent to those skilled in the art to which the present invention relates upon reading the following description in view of the accompanying drawings, in which:

FIG. 1 is a view of a vehicle steering wheel with associated parts of a vehicle occupant restraint apparatus constructed in accordance with the present invention;

FIGS. 3A and 3B are sectional view of parts shown in FIG. 2;

FIG. 4 is a view, partly in section, of a part shown in FIG. 2;

FIG. 5 is a schematic view illustrating other parts of the vehicle occupant restraint apparatus constructed in accordance with the present invention; and FIG. 6 is a schematic view of a part of an alternative embodiment of the present invention.

DESCRIPTION OF PREFERRED EMBODIMENTS

Figure 2:
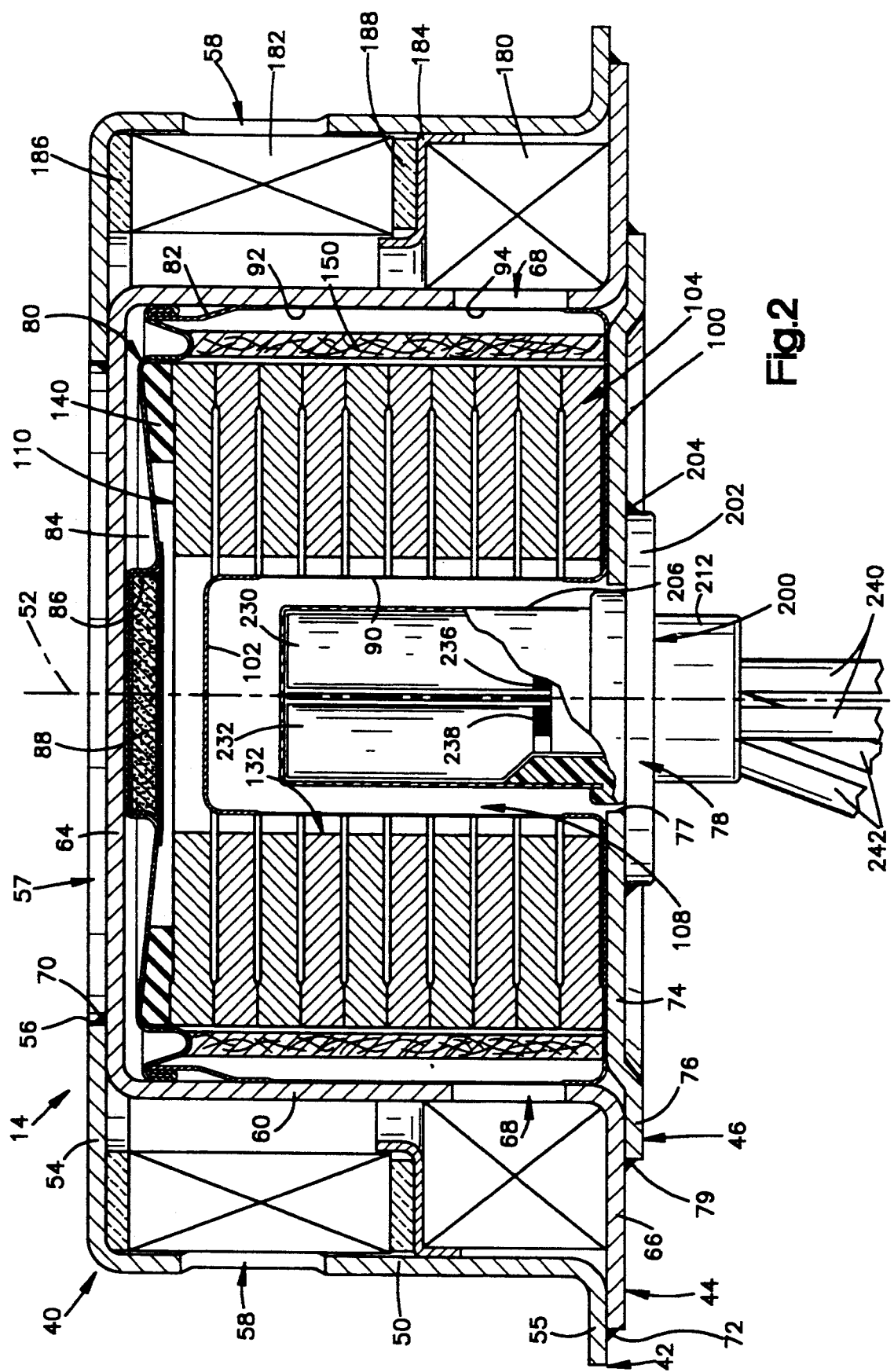
FIG. 2 is an enlarged view, partly in section, of parts of the apparatus of FIG. 1.

As shown partially in FIG. 1, a preferred embodiment of the present invention is a vehicle occupant restraint apparatus 10. The apparatus 10 includes an air bag 12, an inflator 14 and a cover 16. The air bag 12, the inflator 14 and the cover 16 are components of a module 18 which is mounted on a vehicle steering wheel 20.

Upon the occurrence of sudden vehicle deceleration, such as occurs in a collision, the inflator 14 is energized and produces a large volume of gas. The gas produced by the inflator 14 inflates the air bag 12. As the air bag 12 begins to inflate, it ruptures weakened portions 22 of the cover 16, one of which is shown in FIG. 1. As the air bag 12 continues to inflate, it moves past the ruptured cover 16 and into the space between the driver of the vehicle and the steering wheel 20 to restrain movement of the driver, as is known.

As shown in FIG. 2, the inflator 14 includes a housing 40. The housing 40 is made of three pieces, namely a diffuser cup 42, a combustion cup 44, and a combustion chamber cover 46. The diffuser cup 42, the combustion cup 44 and the combustion chamber cover 46 are made of metal, such as UNS S30100 stainless steel.

The diffuser cup 42 is generally cup shaped, and has a cylindrical side wall 50 centered on the central axis 52 of the inflator 14. The side wall 50 of the diffuser cup 42 extends axially between a flat upper end wall 54 and a flat lower flange 55. The upper end wall 54 and the lower flange 55 are generally parallel to each other and perpendicular to the central axis 52. An annular inner surface 56 on the upper end wall 54 defines a central opening 57 in the upper end wall 54. An array of gas outlet openings 58 extends circumferentially around an upper portion of the cylindrical side wall 50.

The combustion cup 44 also is generally cup shaped, and is located coaxially within the diffuser cup 42. The combustion cup 44 thus has a cylindrical side wall 60 centered on the axis 52. The cylindrical side wall 60 extends axially between a flat upper end wall 64 and a flat lower flange 66. The upper end wall 64 and the lower flange 66 are generally parallel to each other and perpendicular to the axis 52. An array of gas flow openings 68 extends circumferentially around a lower portion of the cylindrical side wall 60 of the combustion cup 44.

The combustion cup 44 is welded to the diffuser cup 42, preferably by laser welding. Specifically, the upper end wall 64 of the combustion cup 44 is welded with a continuous weld to the upper end wall 54 of the diffuser cup 42 at a weld location 70 extending circumferentially about the annular inner surface 56 on the upper end wall 54. The lower flange 66 on the combustion cup 44 is welded to the lower flange 55 on the diffuser cup 42 at a weld location 72 extending circumferentially about the lower flanges 55 and 66.

The combustion chamber cover 46 is a generally flat metal piece with a circular central portion 74 and an annular outer flange 76. The central portion 74 has an annular inner surface 77 defining a circular opening 78 which is centered on the axis 52. The flange 76 is parallel to, but axially offset from, the central portion 74. The flange 76 on the combustion chamber cover 46 is welded to the flange 66 on the combustion cup 44 at a circumferentially extending weld location 79, again preferably by laser welding.

A canister 80 is contained within the combustion cup 44. The canister 80 has a generally cylindrical body 82 and a generally circular cover 84. The cover 84 supports a packet 86 of auto-ignition material 88. The packet 86 of auto-ignition material 88 is preferably designed and constructed in accordance with the invention set forth in U.S. Pat. No. 5,100,174. The canister 80 is preferably made of relatively thin aluminum.

The canister body 82 has a cylindrical inner side wall 90 and a cylindrical outer side wall 92. The outer side wall 92 of the canister body 82 is spaced radially from the inner side wall 90, and adjoins the cylindrical side wall 60 of the combustion cup 44. The outer side wall 92 of the canister body 82 has a relatively thin portion 94 extending over the gas flow openings 68 in the side wall 60 of the combustion cup 44.

The canister body 82 further has a lower end wall 100 and an upper end wall 102. The lower end wall 100 is a flat, ring shaped portion of the canister body 82 which connects the cylindrical outer side wall 92 with the cylindrical inner side wall 90. A compartment 104 is thus defined within the canister 80. The compartment 104 extends radially between the inner and outer side walls 90 and 92, and extends axially between the lower end wall 100 and the cover 84. The radially outer edge portion of the cover 84 is crimped to an adjacent edge portion of the body 82 to close the canister 80 and to seal the compartment 104 hermetically.

The upper end wall 102 of the canister body 82 is a cap shaped portion of the canister body 82 which closes the upper end of the cylindrical inner side wall 90. The lower end wall 100, the cylindrical inner side wall 90 and the upper end wall 102 thus define a cylindrical recess 108 extending axially upward into the center of the canister 80 from the lower end wall 100 to the upper end wall 102.

A body 110 of gas generating material is contained in the canister 80. The body 110 of gas generating material includes a plurality of individual elements 112 (FIGS. 3A and 3B) of gas generating material. Each of the elements 112 of gas generating material is made of a known ignitable material which, when ignited, generates nitrogen gas. Although many types of gas generating material could be used, especially suitable gas generating materials are disclosed in U.S. Pat. No. 3,895,098.

As shown in FIG. 3A, each of the elements 112 of gas generating material is a flat, ring shaped member having a central axis 114. Each of the elements 112 of gas generating material further has a cylindrical inner surface 116, a cylindrical outer surface 118, and a pair of annular opposite side surfaces 120. Each of the opposite side surfaces 120 has an annular abutment portion 122 and an annular recessed portion 124. The abutment portion 122 of each opposite side surface 120 extends radially inward from the cylindrical outer surface 118. The recessed portion 124 of each opposite side surface 120 extends radially outward from the cylindrical inner surface 116 to the associated abutment portion 122.

As shown in FIG. 3B, the elements 112 of gas generating material are arranged in a stack. Adjoining pairs of the annular abutment surface portions 122 are contiguous with each other, and are thus coaxial with each other. Adjoining pairs of the cylindrical inner surfaces 116, and adjoining pairs of the cylindrical outer surfaces 118, likewise are coaxial with each other. The body 110 of gas generating material thus has a tubular shape with a cylindrical outer surface 130 and a cylindrical inner surface 132. The cylindrical outer surface 130 is defined by the individual cylindrical outer surfaces 118. The cylindrical inner surface 132 is defined by the individual cylindrical inner surfaces 116. However, the cylindrical inner surface 132 is interrupted axially by each of a plurality of annular gaps 134 located axially between adjoining pairs of the recessed annular surface portions 124.

With further reference to FIG. 2, the tubular body 110 of gas generating material is contained in the hermetically sealed compartment 104 within the canister 80. The cylindrical inner surface 132 of the body 110 is spaced slightly from the cylindrical inner side wall 90 of the canister 80. The cylindrical outer surface 130 of the body 110 is spaced a greater distance from the cylindrical outer side wall 92 of the canister 80. A resilient elastomeric spacing member 140 located between the body 110 of gas generating material and the canister cover 84 holds the body 110 from shifting out of the position shown in FIG. 2.

A prefilter 150 also is contained in the compartment 104 within the canister 80. The prefilter 150 has a cylindrical shape, and is located radially between the cylindrical outer surface 130 of the body 110 of gas generating material and the cylindrical outer side wall 92 of the canister 80. The prefilter 150 can be constructed as known in the art.

The inflator 14 further includes a slag screen 180 and a final filter 182, as shown schematically in FIG. 2. The slag screen 180 and the final filter 182 are both located in the annular space defined between the combustion cup 44 and the diffuser cup 42. The slag screen 180 is a ring shaped member which extends circumferentially around, and axially across, the array of gas flow openings 68 in the cylindrical side wall 60 of the combustion cup 44. The final filter 182 also is a ring shaped member. The final filter 182 similarly extends circumferentially around and axially across the array of gas outlet openings 58 in the cylindrical side wall 50 of the diffuser cup 42. However, the final filter 182 is radially narrower than the slag screen 180, and is thus spaced radially from the cylindrical side wall 60 of the combustion cup 44. An annular filter shield 184 separates the slag screen 180 from the final filter 182. A first annular graphite seal 186 seals the gap between the top of the final filter 182 and the flat upper end wall 54 of the diffuser cup 42. A second annular graphite seal 188 similarly seals the gap between the bottom of the final filter 182 and the filter shield 184. Like the prefilter 150, the slag screen 180 and the final filter 182 can be constructed as known in the art.

As thus far described, the inflator 14 is constructed to direct gas from the hermetically sealed compartment 104 in the canister 80 to the gas outlet openings 58 in the housing 40. When the body 110 of gas generating material is ignited in the compartment 104, it produces combustion products including a large volume of gas. The gas produced by the body 110 of gas generating material moves radially outward from the body 110 and through the prefilter 150 to the cylindrical outer side wall 92 of the canister 80. The gas moves radially outward against the thin portion 94 of the outer side wall 92 forcefully enough to rupture the thin portion 94 at the gas flow openings 68 in the combustion cup 44. The gas is then directed radially outward through the gas flow openings 68 and into the slag screen 180. The gas is further directed axially upward past the filter shield 184, and radially outward through the final filter 182 to the gas outlet openings 58 in the diffuser cup 42. The prefilter 150, the slag screen 180 and the final filter 182 remove other combustion products from the gas so that the gas is cooled and filtered before it flows from the gas outlet openings 58 to the air bag 12.

The inflator 14 further includes an igniter assembly 200. The igniter assembly 200 extends axially through the lower opening 78 in the housing 40 and into the cylindrical recess 108 at the center of the canister 80. The igniter assembly 200 has a circular base plate 202 which is welded, preferably by laser welding, to the circular central portion 74 of the combustion chamber cover 46 at a circumferentially extending weld location 204.

As shown in FIG. 4, the igniter assembly 200 includes a pressure cartridge 206. The pressure cartridge 206 has a cylindrical housing 208 with an upper portion 210, a lower portion 212, and a flange portion 214 between the upper and lower portions 210 and 212. The lower portion 212 of the housing 208 is closely received through an opening 216 in the center of the base plate 202, and the flange portion 214 of the housing 208 is supported on a flat upper surface 218 of the base plate 202. The upper portion 210 of the housing 208 is formed as a thin, rupturable closure wall of the pressure cartridge 206.

The pressure cartridge 206 contains ignitable material for igniting the body 110 of gas generating material in the canister 80. The ignitable material contained in the pressure cartridge 206 includes a first output charge 230 and a second output charge 232. Each of the first and second output charges 230 and 232 is formed as a body of ignitable material which, when ignited, produces combustion products for igniting the body 110 of gas generating material in the canister 80. Both the first and second output charges 230 and 232 are preferably formed of $BKNO_3$.

The ignitable material contained in the pressure cartridge 206 further includes first and second ignition charges 236 and 238. The first ignition charge 236 is located within the housing 208 in a position adjoining the lower end of the first output charge 230. The first ignition charge 236, when ignited, produces combustion products which ignite the first output charge 230. The second ignition charge 238 is located within the housing 208 in a position adjoining the lower end of the second output charge 232. The second ignition charge 238, when ignited, produces combustion products which ignite the second output charge 232.

The igniter assembly 200 further includes electrical lead wires extending into the pressure cartridge 206. A pair of first lead wires 240 is associated with the first ignition charge 236 in a known manner to ignite the first ignition charge 236 upon the passage of electric current through the pressure cartridge 206 between the first lead wires 240. A pair of second lead wires 242 is similarly associated with the second ignition charge 238 to ignite the second ignition charge 238 upon the passage of electric current through the pressure cartridge 206 between the second lead wires 242.

The igniter assembly 200 can be actuated in a first stage or in a second stage. When the igniter assembly 200 is actuated in the first stage, electric current is directed through the pressure cartridge 206 between the first lead wires 240 but not between the second lead wires 242. The first ignition charge 236 is thus ignited electrically, and produces combustion products which ignite the first output charge 230. The second output 232 charge is then ignited by sympathetic ignition by the heat produced by the first output charge 230. The first and second output charges 230 and 232 are thus ignited sequentially. As the first and second output charges 230 and 232 burn following sequential ignition, they produce first stage combustion products including heat and a pressure wave.

The first stage combustion products produced by the first and second output charges 230 and 232 rupture the closure wall 210, and move from the pressure cartridge 206 toward the cylindrical inner side wall 90 of the canister 80. The first stage combustion products also rupture the cylindrical inner side wall 90 and move into the compartment 104 within the canister 80 to ignite the body 110 of gas generating material in the compartment 104. The first stage combustion products move against each of the elements 112 of the gas generating material simultaneously. The first stage combustion products thus move against the entire cylindrical inner surface 132 of the body 110, and also move against the recessed surface portions 124 of the body 110 within the gaps 134. The first stage combustion products thus ignite the body 110 of gas generating material at a first ignitable surface area of the body 110 which is defined by the cylindrical inner surface 132 and the recessed surface portions 124. The first stage combustion products may form cracks in the body 110 of gas generating material, in which case the first ignitable surface area of the body 110 would further include the surfaces located within the cracks.

When the body 110 of gas generating material has been ignited at the first ignitable surface area by the first stage combustion products, it proceeds to burn at a first rate of combustion. As a result, the body 110 of gas generating material generates gas for inflating the air bag 12 at a first rate of gas generation.

When the igniter assembly 200 is actuated in the second stage, electric current is directed between the first lead wires 240, and is simultaneously directed between the second lead wires 242. The first and second ignition charges 236 and 238 are thus ignited simultaneously. The first and second ignition charges 236 and 238 then produce combustion products which ignite the first and second output charges 230 and 232 simultaneously.. As the first and second output charges 230 and 232 burn following simultaneous ignition, they produce second stage combustion products. Like the first stage combustion products, the second stage combustion products include heat and a pressure wave. However, the second stage combustion products are produced more rapidly because the first and second output charges 230 and 232 are ignited in the second stage simultaneously rather than sequentially. The second stage combustion products therefore include a greater amount of heat and a more forceful pressure wave.

The second stage combustion products, particularly the more forceful pressure wave, move from the pressure cartridge 206 into the compartment 104 in the canister 80 more rapidly and forcefully than the first stage combustion products. The second stage combustion products also move against each of the elements 112 of gas generating material simultaneously. However, the second stage combustion products move against the surfaces 132 and 124 of the body 110 forcefully enough to form cracks at those surfaces which are substantially wider and deeper than cracks that might otherwise be formed by the first stage combustion products. The newly exposed surfaces located within the wider and deeper cracks define a second ignitable surface area in addition to the first ignitable surface area described above, and thus increase the total ignitable surface area of the body 110. The second stage combustion products move against both the first and second ignitable surface areas to ignite the body 110 at the greater total ignitable surface area.

When the body 110 of the gas generating material has been ignited at the greater total ignitable surface area by the second stage combustion products, it proceeds to burn at a second, faster rate of combustion because a greater amount of surface area has been ignited to initiate combustion of the body 110. As a result, the body 110 of gas generating material generates gas for inflating the air bag 12 at a second, faster rate of gas generation.

As described above with reference to FIG. 1, the module 18 on the steering wheel 20 includes the air bag 12, the inflator 14 and the cover 16. Other parts of the vehicle occupant restraint apparatus 10 in addition to the module 18 are illustrated schematically in FIG. 5. As illustrated in FIG. 5, the vehicle occupant restraint apparatus 10 further includes a deceleration sensing assembly 250, a position sensing assembly 260, and a controller 270.

The deceleration sensing assembly 250 senses the occurrence of a predetermined amount of vehicle deceleration which is indicative of a collision, and responds by sending a deceleration signal to the controller 270. The deceleration sensing assembly 250 can be constructed to generate a single deceleration signal in response to any amount of deceleration which indicates the occurrence of a collision. Alternatively, the deceleration sensing assembly 250 can be constructed to generate two or more differing deceleration signals, each of which indicates both the occurrence and the relative amount of deceleration. Such deceleration sensing assemblies are known in the art.

The position sensing assembly 260 senses the position of a vehicle occupant. Preferably, the position sensing assembly 260 senses when the vehicle driver has moved into a position other than a predetermined, upright seated position facing the module 18 containing the air bag 12 on the steering wheel 20. When the driver moves into a position other than the predetermined, upright seated position, the position sensing assembly 260 generates an out-of-position signal and sends the out-of-position signal to the controller 270. Such position sensing assemblies also are known in the art.

The vehicle occupant restraint apparatus 10 has two different modes of operation. In the first mode of operation, the air bag 12 is inflated at a first rate of inflation. In the second mode of operation, the air bag 12 is inflated more rapidly at a second, faster rate of inflation. When the vehicle experiences a collision, the mode of operation, and hence the rate of inflation of the air bag 12, is selected by the controller 270 in response to the signals generated by the deceleration sensing assembly 250 and the position sensing assembly 260.

If the vehicle experiences a collision when the driver is not in the predetermined, upright seated position, the controller 270 will select the first mode of operation so that the air bag 12 will be inflated at the first, relatively slow rate of inflation. Specifically, the position sensing assembly 260 provides the controller 270 with an out-of-position signal indicating that the driver is not in the predetermined, upright seated position. The deceleration sensing assembly 250 provides the controller 270 with a deceleration signal indicating that a collision has occurred. The controller 270 then generates a first actuating signal which indicates that the air bag 12 is to be inflated at the first rate of inflation.

The first actuating signal generated by the controller 270 is transmitted to the inflator 14 in the module 18. The inflator 14 receives the first actuating signal in the form of electric current which is directed through the igniter assembly 200 between the first lead wires 240. When electric current is directed through the igniter assembly 200 between the first lead wires 240, the igniter assembly 200 is actuated in the first stage, as described above. This causes the body 110 of gas generating material to generate gas for inflating the air bag 12 at the first rate of gas generation. The gas which is generated at the first rate of gas generation moves outward from the inflator 14 and into the air bag 12 at a first flow rate. The gas thus inflates the air bag 12 at the first rate of inflation.

If the vehicle experiences a collision when the driver is in the predetermined, upright seated position, the controller 270 will select the second mode of operation so that the air bag 12 will be inflated at the second, faster rate of inflation. In this case, the deceleration sensing assembly 250 provides the controller 270 with a deceleration signal indicating that a collision has occurred, but the position sensing assembly 260 does not provide the controller 270 with an out-of-position signal. The controller 270 then generates a second actuating signal which indicates that the air bag 12 is to be inflated at the second rate of inflation.

The second actuating signal also is transmitted from the controller 270 to the inflator 14 in the module 18. The second actuating signal is received by the inflator 14 in the form of electric current which is directed between the first lead wires 240 and electric current which is simultaneously directed between the second lead wires 242. When electric current thus flows through the igniter assembly 200 between both pairs of lead wires 240 and 242, the igniter assembly 200 is actuated in the second stage. This causes the body 110 of gas generating material to generate gas for inflation of the air bag 12 at the second, faster rate of gas generation. The gas which is generated at the second rate of gas generation moves outward from the inflator 14 and into the air bag 12 at a second, faster flow rate to inflate the air bag 12 at the second, faster rate of inflation.

As noted above, the deceleration sensing assembly 250 can be constructed to generate a deceleration signal which indicates both the occurrence and the relative amount of vehicle deceleration upon the occurrence of a collision. The deceleration sensing assembly 250 could then indicate that the severity of the collision is of a predetermined low level or of a predetermined high level. The controller 270 could respond to a low-severity deceleration signal by selecting the first mode of operation of the apparatus 10 to inflate the air bag 12 at the first, relatively slow rate of inflation. The controller 270 could respond to a high-severity deceleration signal by selecting the second mode of operation to inflate the air bag 12 at the second, faster rate of inflation. Preferably, however, the controller 270 would alternatively select the first mode of operation in response to a high-severity deceleration signal if the position sensing assembly 260 has generated an out-of-position signal.

An alternative embodiment of the present invention is a vehicle occupant restraint apparatus including an alternative igniter assembly 300 in place of the igniter assembly 200 described above. As shown schematically in FIG. 6, the igniter assembly 300 includes a first output charge 302 and a second output charge 304. The second output charge 304 is more powerful than the first output charge 302. The igniter assembly 300 also has first and second ignition charges 306 and 308, as well as first and second pairs of lead wires 310 and 312, which are respectively associated with the first and second output charges 302 and 304.

The igniter assembly 300 is actuatable in a first stage and, alternatively, in a second stage. When the igniter assembly 300 is to be actuated in the first stage, the controller 270 generates a first actuating signal in the form of electric current which is directed between the first lead wires 310 but not between the second lead wires 312. The first ignition charge 306 is then ignited electrically, and produces combustion products which ignite the first output charge 302. As the first output charge 302 burns, it produces first stage combustion products which include heat and a pressure wave. The first stage combustion products produced by the first output charge 302 ignite the body 110 of gas generating material at a first ignitable surface area of the body 110, and thus cause the air bag 12 to be inflated at a first rate of inflation.

When the igniter assembly 300 is to be actuated in the second stage, the controller 270 generates a second actuating signal in the form of electric current which is directed between the second lead wires 312 but not between the first lead wires 310. The second ignition charge 308 is then ignited electrically, and produces combustion products which ignite the second output charge 304. As the second output charge 304 burns, it produces second stage combustion products which include a greater amount of heat and a more forceful pressure wave as compared with the first stage combustion products produced by the first output charge 302. Like the second stage combustion products described above with reference to the igniter assembly 200, the second stage combustion products produced by the igniter assembly 300 break the body 110 of gas generating material sufficiently to cause a substantial increase in the total ignitable surface area of the body 110. The second stage combustion products produced by the igniter assembly 300 thus cause the air bag 12 to be inflated at a second, faster rate of inflation as compared with the first stage combustion products.

The invention has been described with reference to preferred embodiments, each of which includes a driver's side air bag. From the above description of the invention, those skilled in the art will perceive improvements, changes and modifications. For example, the invention is equally applicable to passenger side air bags or other inflatable vehicle occupant restraints. Such improvements, changes and modifications within the skill of the art are intended to be covered by the appended claims.

I claim:

1. Apparatus for use in inflating an inflatable vehicle occupant restraint, said apparatus comprising:

gas generating means for generating gas to inflate the inflatable vehicle occupant restraint, said gas generating means including a body of gas generating material which, when ignited, generates said gas, said body of gas generating material having an initial surface portion; and igniter means for igniting said body of gas generating material, said igniter means being actuatable in a first stage and in a second stage;

said igniter means igniting said body of gas generating material at a first ignitable surface area of said body of gas generating material when said igniter means is actuated in said first stage, said first ignitable surface area including said initial surface portion of said body of gas generating material;

said igniter means including means for forming cracks in said body of ignitable gas generating material when said igniter means is actuated in said second stage, said cracks containing newly exposed surface portions of said body of gas generating material;

said igniter means igniting said body of gas generating material at a second ignitable surface area of said body of gas generating material when said igniter means is actuated in said second stage, said second ignitable surface area including said initial surface portion, said second ignitable surface area further including said newly exposed surface portions and thus being larger than said first ignitable surface area.

2. Apparatus as defined in claim 1 wherein said igniter means includes means for producing a first pressure wave and for directing said first pressure wave to move against said initial surface portion of said body of gas generating material when said igniter means is actuated in said first stage, said igniter means further including means for producing a second pressure wave and for directing said second pressure wave to move against said initial surface portion of said body of gas generating material when said igniter means is actuated in said second stage, said second pressure wave being more forceful than said first pressure wave and thus being forceful enough to form said cracks which contain said newly exposed surface portions of said body of gas generating material.

3. Apparatus as defined in claim 1 wherein said body of gas generating material is defined by a plurality of separate elements of gas generating material, said igniter means igniting all of said elements of gas generating material simultaneously when actuated in said first stage and also when actuated in said second stage.

4. Apparatus as defined in claim 1 wherein said body of gas generating material is defined by a plurality of elements of gas generating material, said apparatus further comprising an inflator housing having means for defining a combustion chamber which contains all of said elements of gas generating material in fluid communication with each other before said inflator means is actuated.

5. Apparatus as defined in claim 1 wherein said body of gas generating material is defined by a plurality of elements of gas generating material, said igniter means including a first output charge comprising a first body of ignitable material which, when ignited, produces combustion products that move against all of said elements of gas generating material simultaneously, said igniter means further including a second output charge comprising a second body of ignitable material which, when ignited, produces combustion products that move against all of said elements of gas generating material simultaneously, said igniter means igniting said first and second output charges sequentially when said igniter means is actuated in said first stage, said igniter means igniting said first and second output charges simultaneously when said igniter means is actuated in said second stage.

6. Apparatus as defined in claim 5 wherein said igniter means includes a cartridge having a longitudinal axis, said first and second output charges being contained in said cartridge and extending along said longitudinal axis coextensively with each other.

* * * * *